United States Patent
Mock et al.

(10) Patent No.: US 12,369,752 B2
(45) Date of Patent: Jul. 29, 2025

(54) DOUBLE WHIP STAND MIXER ACCESSORY

(71) Applicant: WHIRLPOOL CORPORATION, Benton Harbor, MI (US)

(72) Inventors: Brandon T. Mock, St. Joseph, MI (US); Sayer James Murphy, St. Joseph, MI (US)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 804 days.

(21) Appl. No.: 17/568,016

(22) Filed: Jan. 4, 2022

(65) Prior Publication Data

US 2023/0210308 A1 Jul. 6, 2023

(51) Int. Cl.
| A47J 43/00 | (2006.01) |
| A47J 43/044 | (2006.01) |
| A47J 43/07 | (2006.01) |
| A47J 43/08 | (2006.01) |

(52) U.S. Cl.
CPC ......... *A47J 43/044* (2013.01); *A47J 43/0711* (2013.01); *A47J 43/082* (2013.01)

(58) Field of Classification Search
CPC ............................ A47J 43/044; A47J 43/0711
See application file for complete search history.

(56) References Cited

U.S. PATENT DOCUMENTS

| 4,023,780 A | 5/1977 | Egid |
| 4,176,971 A | 12/1979 | Emster et al. |
| 5,000,578 A | 3/1991 | Artin et al. |
| 6,652,137 B1 | 11/2003 | Bosch et al. |
| 10,660,476 B2 | 5/2020 | Jin |
| 2001/0040838 A1 | 11/2001 | Buchsteiner et al. |
| 2012/0081993 A1 | 4/2012 | Annis et al. |
| 2018/0000291 A1* | 1/2018 | Ozturk ................ B01F 27/13 |
| 2021/0282597 A1* | 9/2021 | Lin ..................... A47J 43/044 |

FOREIGN PATENT DOCUMENTS

| CN | 210493818 | 5/2020 |
| EP | 1967105 | 9/2008 |
| EP | 2675330 | 3/2015 |
| GB | 2453546 | 4/2009 |
| GB | 2548082 | 9/2017 |
| WO | 2011144820 | 11/2011 |
| WO | 2018036780 | 3/2018 |

\* cited by examiner

*Primary Examiner* — Anshu Bhatia
(74) *Attorney, Agent, or Firm* — PRICE HENEVELD LLP

(57) ABSTRACT

A mixer includes an eccentric drive mounted on a mixing head of the mixer and configured to orbit around a central axis of a mixing area and rotate an offset rotational axis of a drive shaft about the central axis of the mixing area. A dual whisk beater attachment includes a housing operably coupled to the eccentric drive, a first whisk rotatably mounted within the housing and operably coupled to the drive shaft of the eccentric drive of the mixer, and a second whisk rotatably mounted within the housing and operably coupled to the drive shaft of the eccentric drive of the mixer via a plurality of gears disposed within the housing. The first whisk is configured to rotate about a first whisk rotational axis and orbit the central axis of a mixing area, and the second whisk is configured to rotate about a second whisk rotational axis.

19 Claims, 9 Drawing Sheets

DOUBLE WHIP STAND MIXER ACCESSORY

BACKGROUND OF THE DISCLOSURE

The present disclosure generally relates to a beater attachment for a stand mixer, and, more particularly, to a dual whisk beater attachment including a first whisk and a second whisk operably coupled to the first whisk via a plurality of operably coupled gears, wherein the first whisk is configured to rotate about a first offset rotational axis of the drive shaft and orbit a central axis of a mixing area and the second whisk is configured to rotate about a second rotational axis and rotate about the central axis.

SUMMARY OF THE DISCLOSURE

One aspect of the present disclosure is a mixer for combining food constituents into a homogeneous mass. The mixer includes an eccentric drive mounted on a mixing head of the mixer and configured to orbit around a central axis of a mixing area and rotate an offset rotational axis of a drive shaft about the central axis of the mixing area. A dual whisk beater attachment may be operably coupled with the mixer and includes a housing operably coupled to the eccentric drive, a first whisk rotatably mounted within the housing and operably coupled to the drive shaft of the eccentric drive of the mixer, and a second whisk rotatably mounted within the housing and operably coupled to the drive shaft of the eccentric drive of the mixer via a plurality of gears disposed within the housing. The first whisk is configured to rotate about a first whisk rotational axis and orbit the central axis of the mixing area, and the second whisk is configured to rotate about a second whisk rotational axis.

Additional features of this aspect may include the drive shaft being coupled with an electric motor disposed within the mixing head, wherein the drive shaft is received within the housing by which the housing is coupled to the eccentric drive. The mixer may include a mixing head to which the eccentric drive is coupled, and wherein the electric motor is disposed within the mixing head. The housing may be rotationally and operably coupled to an attachment drive lug disposed on the eccentric drive. The offset rotational axis of the drive shaft and the first whisk rotational axis may be coincident and the first whisk may be configured to rotate about the offset rotational axis of the drive shaft and orbit the central axis of a mixing area. The first whisk may be operably coupled to the drive shaft of the mixer by a releasable connector rotatably mounted in the housing. The releasable connector may directly and coaxially couple the drive shaft with the first whisk and the plurality of gears disposed within the housing may comprise a drive gear and a second whisk driven gear, the drive gear being disposed on the releasable connector such the drive shaft and the drive gear are axially coincident. The plurality of gears may drive the first whisk and the second whisk via a 1:1 gear ratio. The first whisk rotational axis may be offset from the offset rotational axis of the drive shaft and orbit the central axis of the mixing area along a first orbit path and the second whisk rotational axis may be offset from the central axis and orbit the central axis of the mixing area along a second orbit path. The housing may be operably coupled to the drive shaft of the eccentric drive by a magnet disposed in the housing. The first whisk rotational axis may be offset from the offset rotational axis of the drive shaft and orbit a central axis of a mixing area along a first orbit path and the second whisk rotational axis may be offset from the central axis and orbits the central axis along a second orbit path. The gears disposed within the housing may comprise a drive gear, a first whisk driven gear, a second whisk driven gear, and an idler gear operably coupled with the drive gear and one of either the first whisk driven gear or the second whisk driven gear. The drive gear may be directly coupled with and coaxially aligned with the drive shaft via the releasable connector, the first whisk driven gear may be directly coupled with and coaxially aligned with the first whisk, and the second whisk driven gear may be directly coupled with and coaxially aligned with the second whisk. The first whisk may comprise a first plurality of whips and the second whisk comprises a second plurality of whips and the first plurality of whips and the second plurality of whips rotate out of phase, such that contact between the first plurality of whips and the second plurality of whips is avoided, and the first whisk and second whisk may rotate in opposite directions.

An additional aspect of the present disclosure is a dual whisk beater attachment for a stand mixer, the dual whisk beater attachment comprising a housing operably coupled to an eccentric drive of the stand mixer. A first whisk is operably and axially coupled to a drive shaft of the stand mixer and a second whisk is operably coupled to the first whisk via a plurality of operably coupled gears disposed in the housing. The first whisk is configured to rotate about a first offset rotational axis of the drive shaft and orbit a central axis of a mixing area and the second whisk is configured to rotate about a second rotational axis and rotate about the central axis.

Additional features of this aspect may include the first whisk having a first plurality of whips and the second whisk having a second plurality of whips, where the first plurality of whips and the second plurality of whips are out of phase such that contact between the first plurality of whips and the second plurality of whips is avoided; and the first whisk and second whisk rotate in opposite directions. The first whisk may be configured to rotate about a first rotational axis offset from the drive shaft and orbit a central axis of a mixing area along a first orbit path and the second whisk may be configured to rotate about a second rotational axis offset from the central axis and orbit the central axis along a second orbit path.

A further aspect of the present disclosure is a dual whisk beater attachment for a stand mixer, the dual whisk beater attachment comprising a first whisk operably coupled to a drive shaft of the stand mixer, a second whisk operably coupled to the drive shaft of the stand mixer; and a plurality of gears by which the first whisk and the second whisk are operably coupled to the drive shaft of the stand mixer. The first whisk is configured to rotate about a first rotational axis offset from the drive shaft and orbit a central axis of a mixing area along a first orbit path and the second whisk is configured to rotate about a second rotational axis offset from the central axis and orbit the central axis along a second orbit path.

Additional features of this aspect may include the plurality of gears being disposed within the housing and further comprising a drive gear, a first whisk driven gear, a second whisk driven gear, and an idler gear operably coupled with the drive gear and the second whisk driven gear. The first whisk may comprise a first plurality of whips and the second whisk may comprise a second plurality of whips, where the first plurality of whips and the second plurality of whips rotate out of phase, such that contact between the first plurality of whips and the second plurality of whips is avoided, the first whisk and second whisk rotate in opposite directions, and the first plurality of whips comprises four symmetrically situated whips having a first vertical length and a first transverse width and the second plurality of whips comprises three symmetrically situated whips having a second vertical length and a second transverse width, such that the first vertical length of the first plurality of whips is less than the second vertical length of the second plurality of whips and the first transverse width of the first plurality of whips is greater than the second transverse width of the second plurality of whips.

These and other features, advantages, and objects of the present disclosure will be further understood and appreciated by those skilled in the art by reference to the following specification, claims, and appended drawings.

Figure 1:
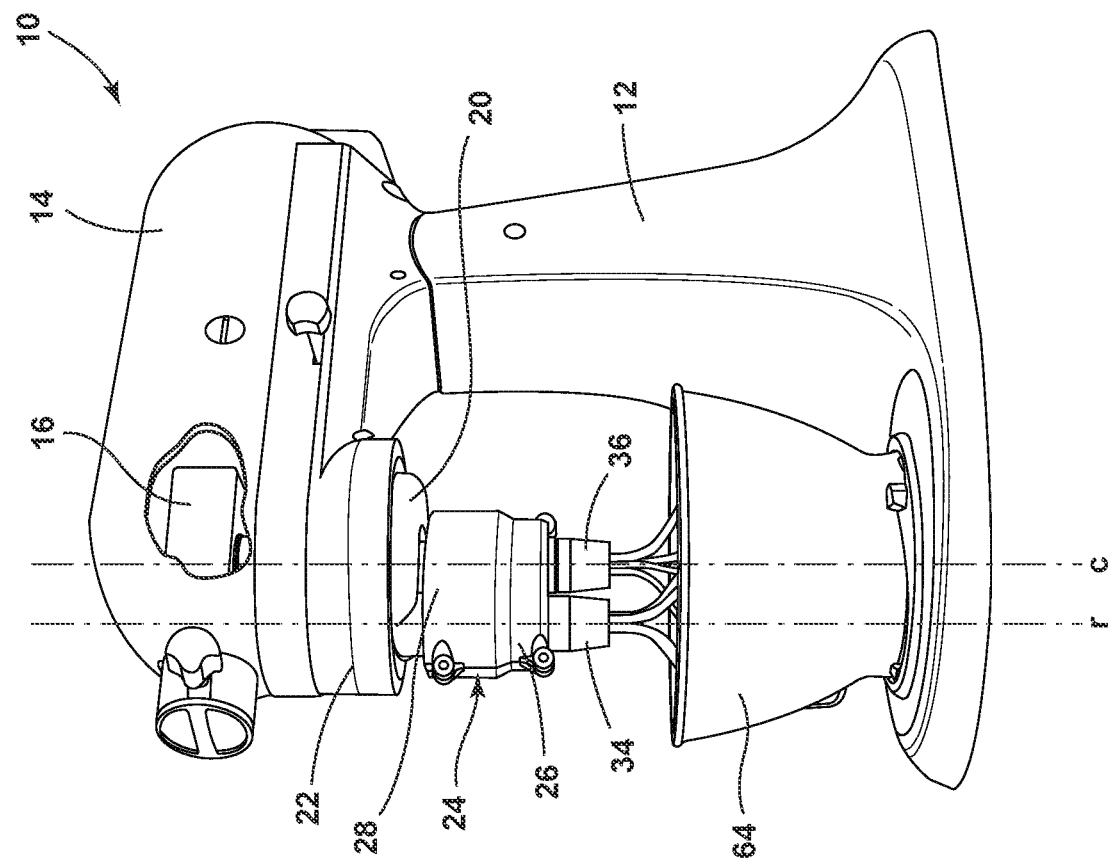
FIG. 1 is a perspective view of a stand mixer to which is operably coupled a first embodiment of the dual whisk beater attachment according to the present disclosure disposed within a mixing bowl.
Figure 2:
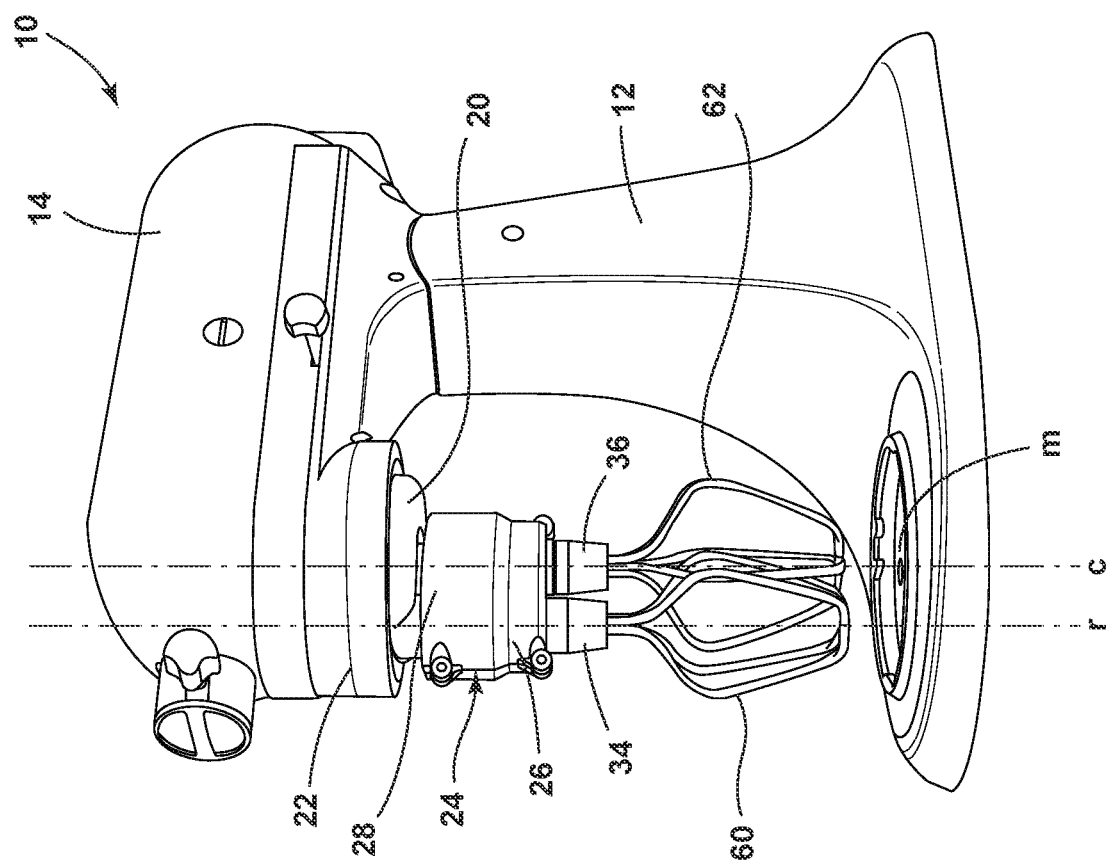
FIG. 2 is a perspective view of the stand mixer to which is operably coupled the first embodiment of the dual whisk beater attachment according to the present disclosure shown in FIG. 1, with mixing bowl removed.
Figure 3:
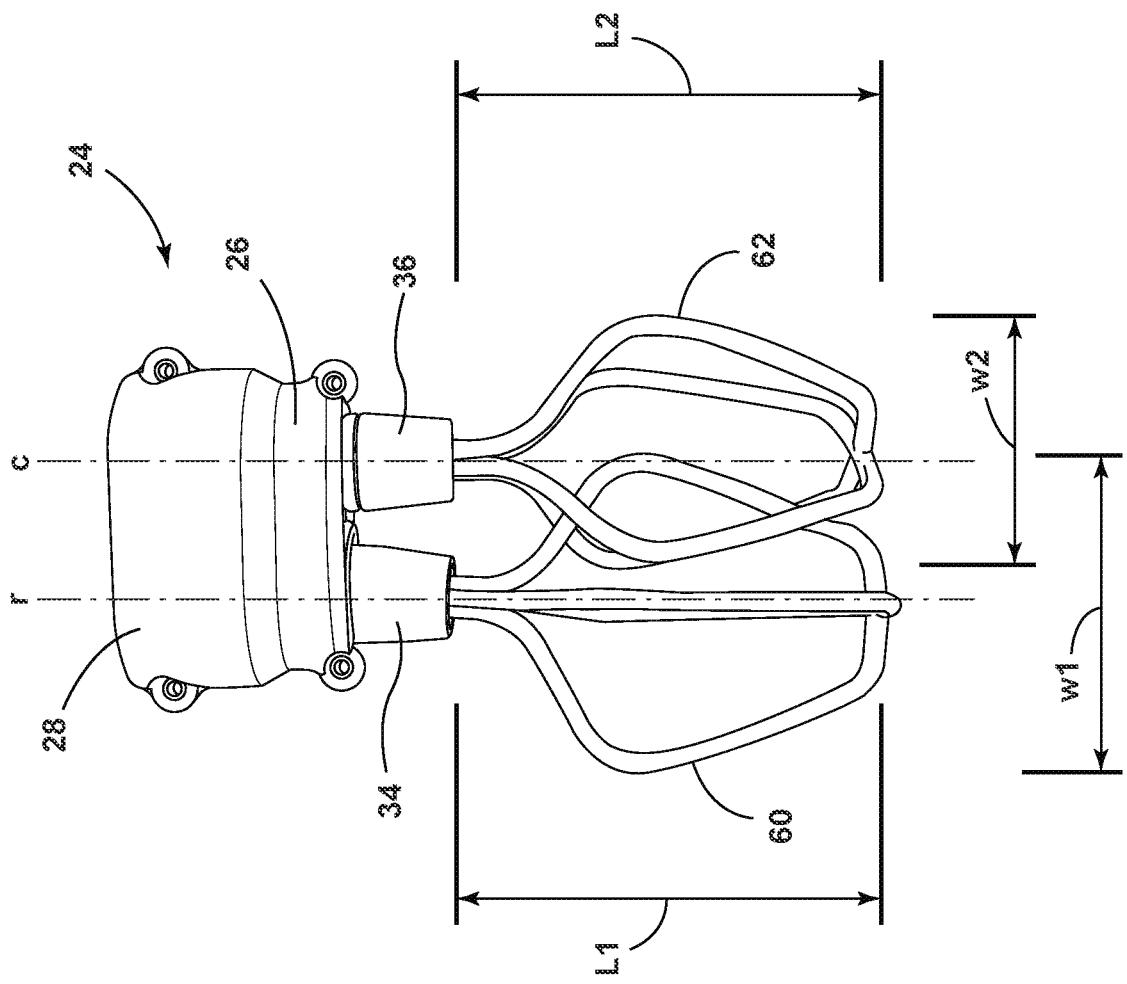
FIG. 3 is a side view of the first embodiment of the dual whisk beater attachment according to the present disclosure shown in FIG. 1.

The components in the figures are not necessarily to scale, emphasis instead being placed upon illustrating the principles described herein.

DETAILED DESCRIPTION

The present illustrated embodiments reside primarily in combinations of method steps and apparatus components related to a dual whisk beater attachment. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Figure 4:
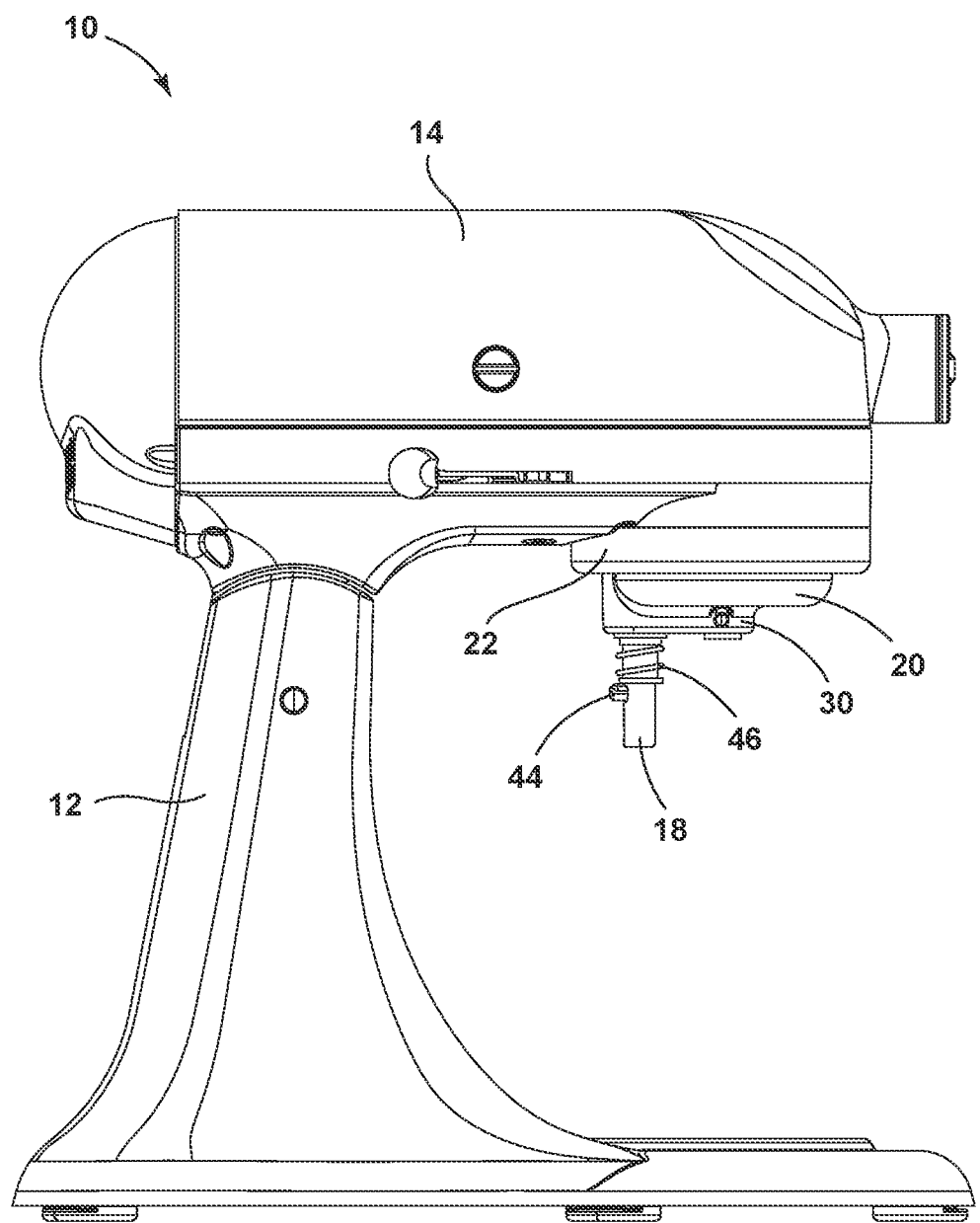
FIG. 4 is a side view of the stand mixer to which may be operably coupled the first embodiment of the dual whisk beater attachment according to the present disclosure shown in FIG. 1, with the dual whisk beater attachment removed.

With reference to the FIGS. 1-9, a stand mixer 10 includes a pedestal 12 and a mixing head 14. An electric motor 16 may is disposed within the mixing head 14 and may be configured to drive a drive shaft 18, as shown in FIG. 4. The drive shaft 18 may be mounted to an eccentric drive 20 disposed on a forward bottom portion 22 of the mixing head 14. The eccentric drive 20 mounted on the mixing head 14 of the mixer 10 is also coupled with the electric motor 16 disposed within the mixing head 14 and may be configured to rotate around a central axis c of a mixing area m. The mixing area m generally coincides with area below a receptacle 64, such as a mixing bowl, within which the food constituents are mixed or combined into a homogeneous mass. The drive shaft 18, which may be offset from the central axis c, may be configured to rotate about a rotational axis r and orbit around the central axis c of the mixing area m as the eccentric drive 20 is rotated about the central axis c of the mixing area m.

A dual whisk beater attachment 24 may be coupled to the mixing head 14 and employed to mix or combine food constituents into a homogeneous mass. The dual whisk beater attachment 24 includes a housing 26 that is operably coupled to the mixing head 14. More particularly, an upper portion 28 of the housing 26 of the dual whisk beater attachment 24 may be operably coupled to the eccentric drive 20 by the drive shaft 18, which is received within the housing 26. The housing 26 may also be rotationally and operably coupled to an attachment drive lug 30 disposed on the eccentric drive 20, which is adapted to engage a mating recess 32 in the housing 26 and thereby rotate the housing 26 and the dual whisk beater attachment 24 around the central axis c of the mixing area m.

Figure 5:
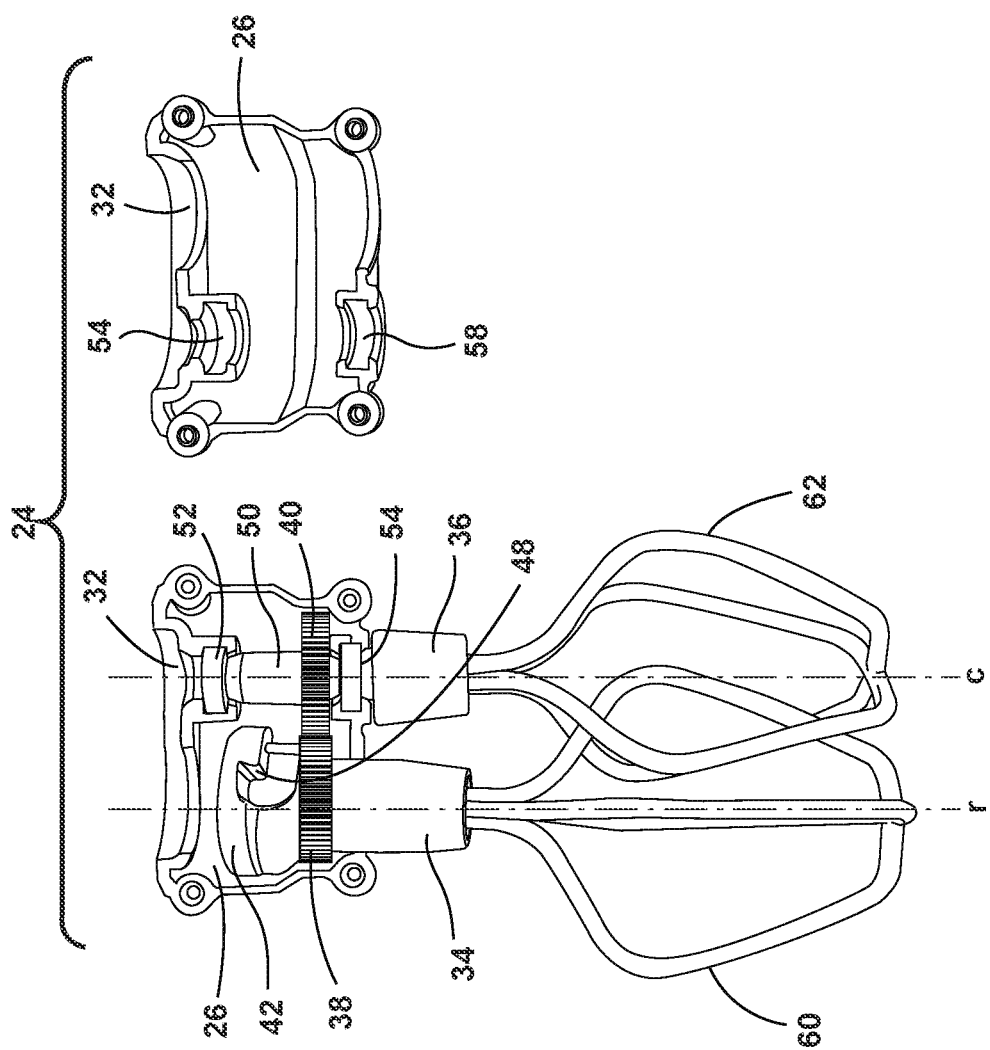
FIG. 5 is a side view of the first embodiment of the dual whisk beater attachment according to the present disclosure shown in FIG. 1, with one side of the housing removed.
Figure 6:
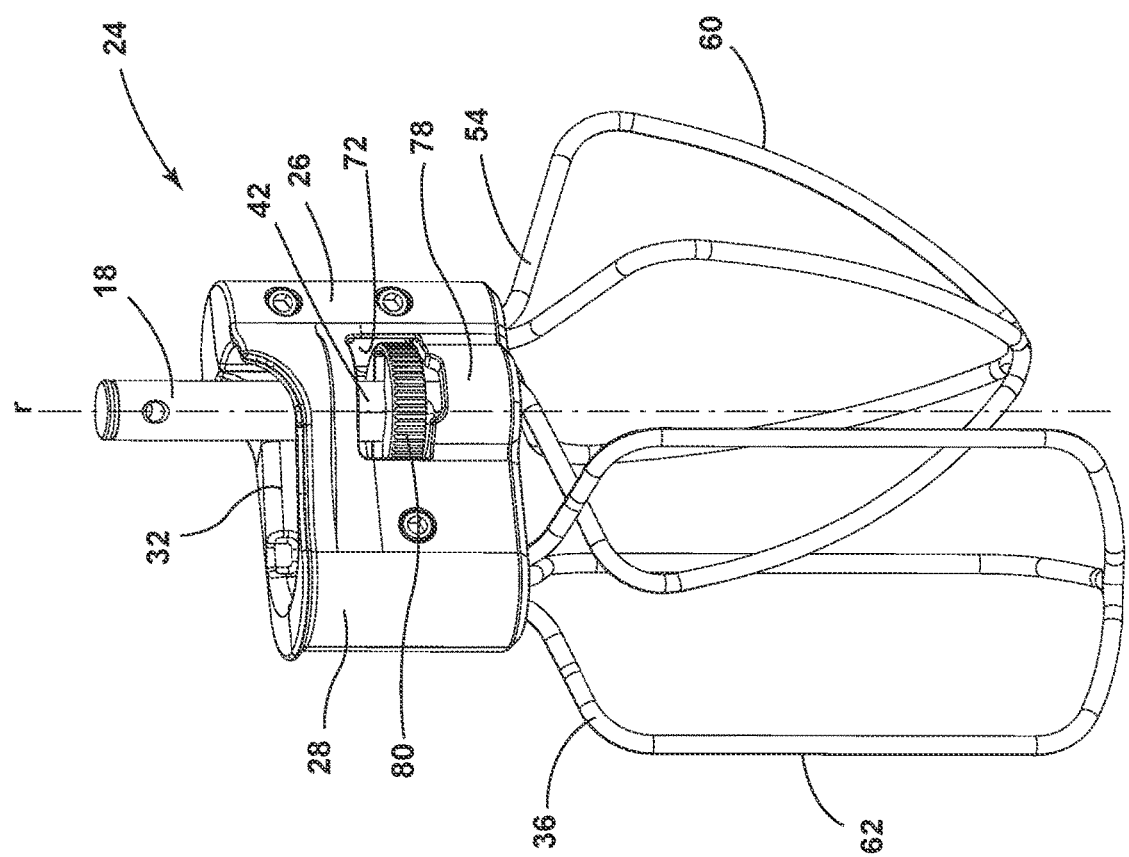
FIG. 6 is a perspective view of a second embodiment of the dual whisk beater attachment according to the present disclosure.
Figure 7:
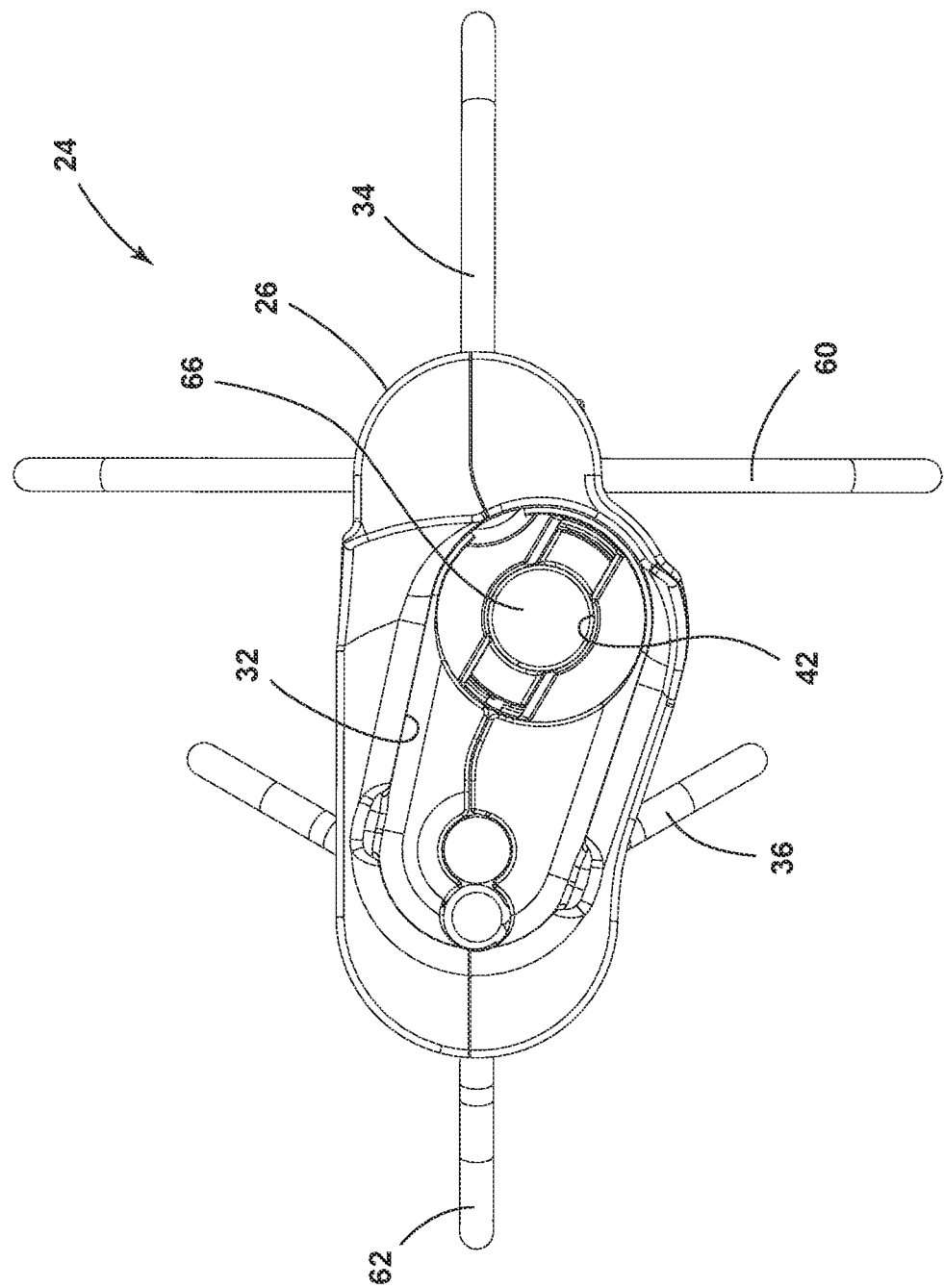
FIG. 7 is a top view of the second embodiment of the dual whisk beater attachment according to the present disclosure shown in FIG. 6.
Figure 8:
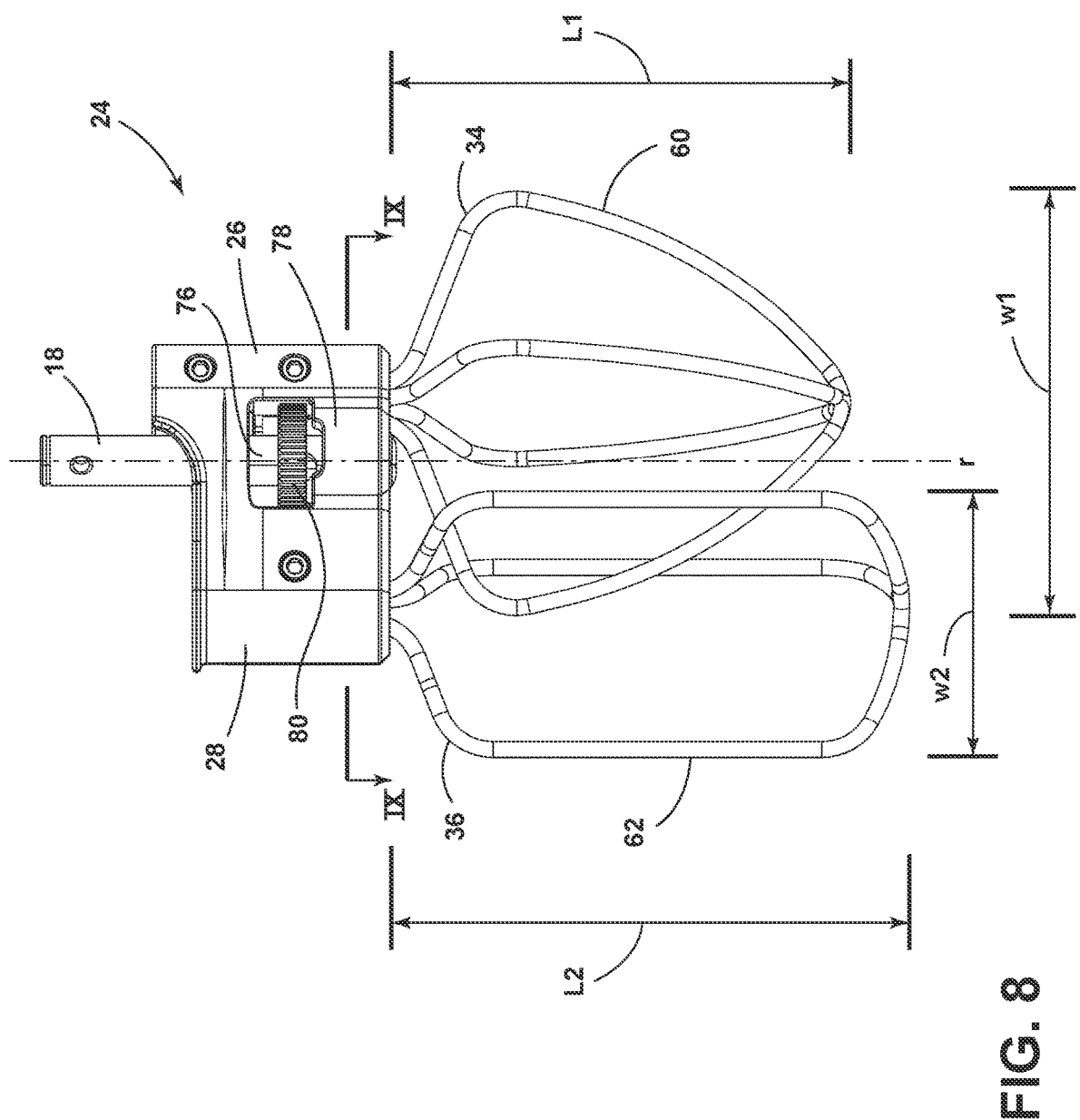
FIG. 8 is a side view of the second embodiment of the dual whisk beater attachment according to the present disclosure shown in FIG. 6.

The dual whisk beater attachment 24 also includes a first whisk 34 rotatably mounted within the housing 26 and operably coupled to the drive shaft 18 of the eccentric drive 20 of the mixer 10. A second whisk 36 may be rotatably mounted within the housing 26 and operably coupled to the drive shaft 18 of the eccentric drive 20 of the mixer 10 via a plurality of gears, in particular, a first drive gear 38 and second driven gear 40, disclosed further below, disposed within the housing 26, as shown in FIG. 5. The first whisk 34 is configured to rotate about a first whisk rotational axis and orbit the central axis c of a mixing area. The second whisk 36 is configured to rotate about a second whisk rotational axis.

In a first embodiment of the dual whisk beater attachment 24, shown in FIGS. 1-5, the drive shaft 18 extends into the housing 26 and is received within a releasable connector 42 rotatably disposed in the housing 26. The releasable connector 42 operably couples the drive shaft 18 to the first whisk 34 and, by doing so, operably couples the drive shaft 18 to the housing 26. The releasable connector 42 cooperates with a tab 44 and spring 46 mounted on the drive shaft 18, as may be seen in FIG. 4, where the tab 44 may engage a recess 48 on the releasable connector 42 to releasably couple the drive shaft 18 to the releasable connector 42, as is known. As the drive shaft 18 rotates about the rotational axis r, the drive shaft 18 drives rotation of the first whisk 34 about the rotational axis r. Additionally, as the drive shaft 18 orbits around the central axis c, the first whisk 34 also orbits around the central axis c of the mixing area m.

The releasable connector 42 thus directly and coaxially couples the drive shaft 18 with the first whisk 34. The releasable connector 42 rotates with the drive shaft 18 and includes the first drive gear 38, shown in FIG. 5, which also rotates with the drive shaft 18. The first drive gear 38 is disposed on the releasable connector 42 such that the drive shaft 18 and the first drive gear 38 are axially coincident. The first drive gear 38 drives rotation of the second driven gear 40, which is operably coupled to the second whisk 36 by a bearing sleeve 50. The bearing sleeve 50 may have an upper bearing 52 and a lower bearing 54 that are received within and supported by an upper bearing race 56 and a lower bearing race 58 to allow free rotation of the second whisk 36. The offset rotational axis of the drive shaft 18 and the rotational axis of the first whisk 34 are coincident and the first whisk 34 is configured to rotate about the offset rotational axis of the drive shaft 18.

The first whisk 34 may comprise a first plurality of whips 60 and the second whisk 36 may comprise a second plurality of whips 62. The first plurality of whips 60 and the second plurality of whips 62 rotate out of phase, such that contact between the first plurality of whips 60 and the second plurality of whips 62 is avoided. The first whisk 34 may be rotated in a first direction, while the second whisk 36 may be rotated in a second opposing direction. As shown in FIGS. 1-5, each of the first plurality of whips 60, 62 may comprise four symmetrically situated whips having a vertical length and a transverse width. As shown, a first vertical length L1 of the first plurality of whips 60 is substantially the same as a second vertical length L2 of the second plurality of whips 62. However, a first transverse width W1 of the first plurality of whips 60 is greater than the second transverse width W2 of the second plurality of whips 62, which better accommodates a shape of the receptacle 64, such as a mixing bowl, in the mixing area m.

Accordingly, the drive shaft 18 drives rotation of the first whisk 34 and, through the plurality of gears 38, 40, also drives rotation of the second whisk 36. The first whisk 34 disposed on the rotational axis r of the drive shaft 18 is also configured to orbit around the central axis c, while the second whisk 36 is disposed on and configured to rotate about the central axis c, without orbiting. As shown in FIG. 5, the plurality of gears 38, 40 may be substantially identical and may drive the first whisk 34 and the second whisk 36 at substantially the same speed at a 1:1 gear ratio.

With reference to FIGS. 6-9, in addition to or as an alternative, a second embodiment of the dual whisk beater attachment 24 is illustrated, where like or similar elements are designated as above. In this configuration, the housing 26 receives the drive shaft 18, as described above, via the releasable connector 42 disposed in the housing 26, as discussed above. As shown, the drive shaft 18 has been removed from the eccentric drive 20 of the mixing head 14 and has been positioned in the housing 26 for illustrative purposes. In addition, the housing 26 may also be rotationally and operably coupled to the attachment drive lug 30 disposed on the eccentric drive 20, which is adapted to engage the mating recess 32 in the housing 26 and thereby rotate the housing 26 around the central axis c of the mixing area m.

However, in the configuration shown in FIG. 6-9, the housing 26 may be also operably coupled to the drive shaft 18 of the eccentric drive 20 by a magnet 66 disposed in the housing 26. The housing 26 includes the magnet 66, which engages the mixer 10 and assists in coupling the dual whisk beater attachment 24 to the mixer 10. The magnet 66 may be used in conjunction with or instead of the releasable connector 42.

Both the first whisk 34 may be offset from the rotational axis r and the second whisk 36 may be offset from the central axis c. In this way, both the first whisk 34 and the second whisk 36 are configured to rotate and orbit. The positions of the first whisk 34 and the second whisk 36 are disposed different distances from the central axis c. Accordingly, the first whisk 34 rotates about a first rotational axis offset from the rotational axis r and travels along a first orbiting path. The second whisk 36 rotates about a second rotational axis offset from the central axis c and travels along a second orbiting path, which is different from the first orbiting path.

Figure 9:
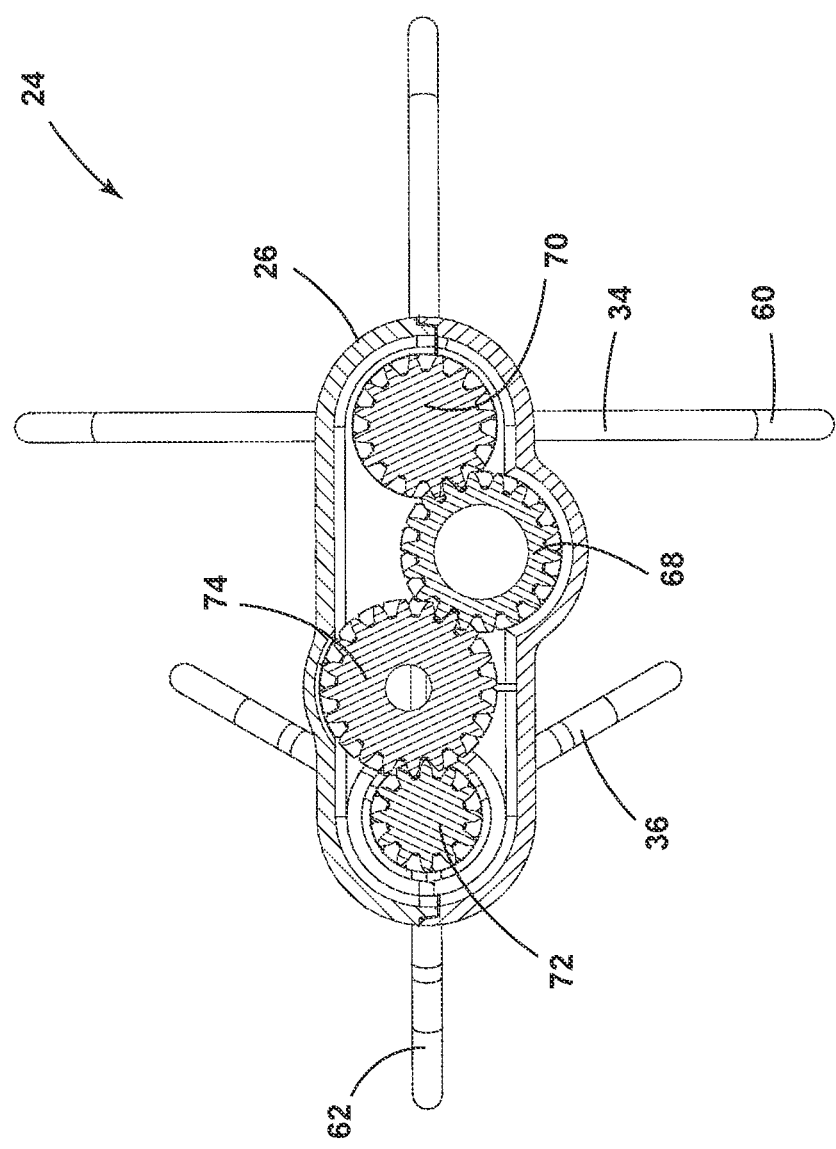
FIG. 9 is a cross-sectional view of the second embodiment of the dual whisk beater attachment according to the present disclosure shown in FIG. 6, taken along the line IX-IX in FIG. 8.

The housing 26 may also include a plurality of gears 68, 70, 72, and 74 for driving the first whisk 34 and the second whisk 36, as perhaps best shown in FIG. 9. The plurality of gears disposed within the housing 26 may include the drive gear 68 directly coupled with and coaxially aligned with the drive shaft 18 via the releasable connector 42. The first whisk driven gear 70 may be directly coupled with and coaxially aligned with the first whisk 34. Likewise, the second whisk driven gear 72 may be directly coupled with and coaxially aligned with the second whisk 36. An idler gear 74 may be operably coupled with the drive gear 68 and one of either the first whisk driven gear 70 or the second whisk driven gear 72. As shown, the idler gear 74 is coupled with the second driven whisk gear 72.

To facilitate separation of the drive shaft 18 from the housing 26, and removal of the second embodiment of the dual whisk beater attachment 24 from the mixer 10, a window 76 may be provided in a side 78 of the housing 26 through which a knob 80 may be accessed. The knob 80 may be directly coupled with and coaxially aligned with the drive gear 68 and the releasable connector 42, which is in turn operably coupled with the drive shaft 18. By pushing up on the knob 80 and slightly rotating the same, the tab 44 may be disengaged from the recess 48 in the releasable connector 42 and the drive shaft 18 may be withdrawn from the housing 26.

In the illustrated configuration, the first whisk 34 and the second whisk 36 have different configurations. The first whisk 34 comprises the first plurality of whips 60 and the second whisk 36 comprises the second plurality of whips 62. As shown, the first plurality of whips 60 comprises four symmetrically situated whips 60 having a first vertical length L1 and a first transverse width W1, while the second plurality of whips 62 comprises three symmetrically situated whips 62 having a second vertical length L2 and a second transverse width W2. The first vertical length L1 of the first plurality of whips 60 may be less than the second vertical length L2 of the second plurality of whips 62. The first transverse width W1 of the first plurality of whips 60 may be greater than the second transverse width W2 of the second plurality of whips 62. These configurations allow both the whisks 34, 36 to rotate proportionally and accommodate a shape of the receptacle 64 in the mixing area m.

As in the first embodiment, the first plurality of whips 60 and the second plurality of whips 62 may be adapted to rotate out of phase, such that contact between the first plurality of whips 60 and the second plurality of whips 62 is avoided. Also, the first whisk 34 and second whisk 36 rotate in opposite directions.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A mixer for combining food constituents into a homogeneous mass, the mixer comprising:
    an eccentric drive mounted on a mixing head of the mixer and configured to orbit around a central axis of a mixing area and rotate an offset rotational axis of a drive shaft about the central axis of the mixing area; and
    a dual whisk beater attachment, the dual whisk beater attachment further comprising:
        a housing operably coupled to the eccentric drive;
        a first whisk rotatably mounted within the housing and operably coupled to the drive shaft of the eccentric drive of the mixer; and
        a second whisk rotatably mounted within the housing and operably coupled to the drive shaft of the eccentric drive of the mixer via a plurality of gears disposed within the housing;
    wherein the first whisk is configured to rotate about a first whisk rotational axis and orbit the central axis of the mixing area; and
    wherein the second whisk is configured to rotate about a second whisk rotational axis.

2. The mixer of claim 1, wherein the drive shaft is coupled with an electric motor disposed within the mixing head, and wherein the drive shaft is received within the housing by which the housing is coupled to the eccentric drive.

3. The mixer of claim 2, wherein the housing is rotationally and operably coupled to an attachment drive lug disposed on the eccentric drive.

4. The mixer of claim 2, wherein the offset rotational axis of the drive shaft and the first whisk rotational axis are coincident and the first whisk is configured to rotate about the offset rotational axis of the drive shaft and orbit the central axis of a mixing area.

5. The mixer of claim 4, wherein the first whisk is operably coupled to the drive shaft of the mixer by a releasable connector rotatably mounted in the housing.

6. The mixer of claim 5, wherein the releasable connector directly and coaxially couples the drive shaft with the first whisk and the plurality of gears disposed within the housing comprises a drive gear and a second whisk driven gear, the drive gear being disposed on the releasable connector such the drive shaft and the drive gear are axially coincident.

7. The mixer of claim 6, wherein the plurality of gears drives the first whisk and the second whisk via a 1:1 gear ratio.

8. The mixer of claim 2, wherein the first whisk rotational axis is offset from the offset rotational axis of the drive shaft and orbits the central axis of the mixing area along a first orbit path and the second whisk rotational axis is offset from the central axis and orbits the central axis of the mixing area along a second orbit path.

9. The mixer of claim 8, wherein the housing is operably coupled to the drive shaft of the eccentric drive by a magnet disposed in the housing.

10. The mixer of claim 1, wherein the first whisk rotational axis is offset from the offset rotational axis of the drive shaft and orbits a central axis of a mixing area along a first orbit path and the second whisk rotational axis is offset from the central axis and orbits the central axis along a second orbit path.

11. The mixer of claim 10, wherein the plurality of gears disposed within the housing comprises a drive gear, a first whisk driven gear, a second whisk driven gear, and an idler gear operably coupled with the drive gear and one of either the first whisk driven gear or the second whisk driven gear.

12. The mixer of claim 11, wherein the drive gear is directly coupled with and coaxially aligned with the drive shaft via the via a releasable connector, the first whisk driven gear is directly coupled with and coaxially aligned with the first whisk, and the second whisk driven gear is directly coupled with and coaxially aligned with the second whisk.

13. The mixer of claim 1, wherein:
the first whisk comprises a first plurality of whips and the second whisk comprises a second plurality of whips;
the first plurality of whips and the second plurality of whips rotate out of phase, such that contact between the first plurality of whips and the second plurality of whips is avoided; and
the first whisk and the second whisk rotate in opposite directions.

14. A dual whisk beater attachment for a stand mixer, the stand mixer comprising an eccentric drive mounted on a mixing head of the stand mixer and the eccentric drive configured to orbit around a central axis of a mixing area and rotate an offset rotational axis of a drive shaft about the central axis of the mixing area, the dual whisk beater attachment comprising:
a housing operably coupled to the eccentric drive of the stand mixer;
a first whisk operably and axially coupled to the drive shaft of the stand mixer; and
a second whisk operably coupled to the first whisk via a plurality of operably coupled gears disposed in the housing;
wherein the first whisk is configured to rotate about a first offset rotational axis of the drive shaft and orbit a central axis of a mixing area and the second whisk is configured to rotate about a second rotational axis and rotate about the central axis.

15. The dual whisk beater attachment of claim 14, wherein the first whisk comprises a first plurality of whips and the second whisk comprises a second plurality of whips;
wherein the first plurality of whips and the second plurality of whips are out of phase such that contact between the first plurality of whips and the second plurality of whips is avoided; and
wherein the first whisk and the second whisk rotate in opposite directions.

16. The dual whisk beater attachment of claim 14, wherein the first whisk is configured to rotate about a first rotational axis offset from the drive shaft and orbit a central axis of a mixing area along a first orbit path and the second whisk is configured to rotate about a second rotational axis offset from the central axis and orbit the central axis along a second orbit path.

17. A dual whisk beater attachment for a stand mixer, the stand mixer comprising an eccentric drive mounted on a mixing head of the stand mixer and the eccentric drive configured to orbit around a central axis of a mixing area and rotate an offset rotational axis of a drive shaft about the central axis of the mixing area, the dual whisk beater attachment comprising:
a first whisk operably coupled to the drive shaft of the stand mixer;
a second whisk operably coupled to the drive shaft of the stand mixer; and
a plurality of gears by which the first whisk and the second whisk are operably coupled to the drive shaft of the stand mixer;
wherein the first whisk is configured to rotate about a first rotational axis offset from the drive shaft and orbit a central axis of a mixing area along a first orbit path and the second whisk is configured to rotate about a second rotational axis offset from the central axis and orbit the central axis along a second orbit path.

18. The dual whisk beater attachment of claim 17, wherein the plurality of gears are disposed within a housing and further comprise a drive gear, a first whisk driven gear, a second whisk driven gear, and an idler gear operably coupled with the drive gear and the second whisk driven gear.

19. The dual whisk beater attachment of claim 17, wherein:
the first whisk comprises a first plurality of whips and the second whisk comprises a second plurality of whips;
the first plurality of whips and the second plurality of whips rotate out of phase, such that contact between the first plurality of whips and the second plurality of whips is avoided;
the first whisk and the second whisk rotate in opposite directions; and
the first plurality of whips comprises four symmetrically situated whips having a first vertical length and a first transverse width and the second plurality of whips comprises three symmetrically situated whips having a second vertical length and a second transverse width, such that the first vertical length of the first plurality of whips is less than the second vertical length of the second plurality of whips and the first transverse width of the first plurality of whips is greater than the second transverse width of the second plurality of whips.

* * * * *